Figure 1:
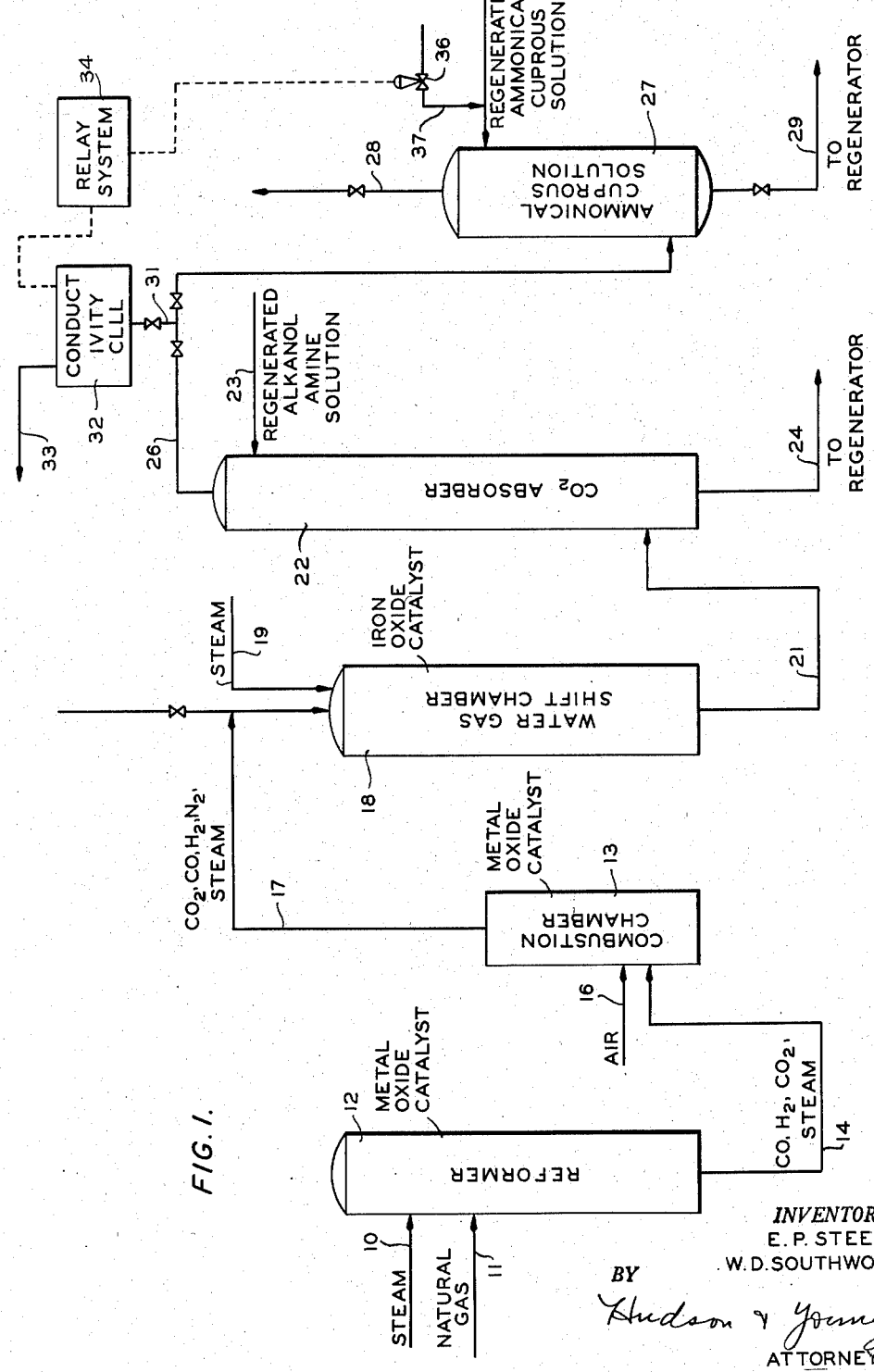

2,890,930

METHOD OF REMOVING CARBON MONOXIDE FROM GASEOUS MIXTURES CONTAINING CARBON DIOXIDE, INCLUDING MEASURING THE CARBON DIOXIDE CONTENT THEREOF AND ACTUATING OPERATING MEANS RESPONSIVE TO SUCH MEASUREMENT

Earl P. Steele and Wallace D. Southworth, Cactus, Tex., assignors to Phillips Petroleum Company, a corporation of Delaware Application November 27, 1953, Serial No. 394,624

13 Claims. (Cl. 23—2)

This invention relates to apparatus and process for the continuous measurement of concentration of carbon dioxide in a gas containing same, and, when desired, to actuation of operating means in response thereto. In one aspect this invention relates to the manufacture of ammonia. In one aspect this invention relates to the manufacture of ammonia synthesis gas. In another aspect this invention relates to the absorption of carbon monoxide, from a gas containing same together with carbon dioxide, in aqueous ammoniacal cuprous solution, and to the removal of carbon dioxide prior to said absorption, when present in proportions impairing efficiency of selectivity of said absorption. In still another aspect this invention relates to method and apparatus, including a conductivity cell and its operation, in which cell the concentration of carbon dioxide in a carbon monoxide-containing gas is measured, and wherein in response to a thus measured increase in carbon dioxide concentration which impairs the carbon monoxide absorption efficiency of the ammoniacal cuprous solution, ammonia is introduced into the absorption zone to react with the excess carbon dioxide therein to maintain optimum carbon monoxide absorption. In still another aspect this invention relates to a conductivity cell, and its operation, in which a dilute electrolyte capable of reacting with carbon dioxide is passed continuously in contact with a flowing stream of a carbon dioxide-containing gas to react electrolyte with carbon dioxide and concomitantly manifest concentration of carbon dioxide in the said gas as a function of change in electrical conductivity of the electrolyte resulting from the electrolyte-carbon dioxide reaction.

In accordance with a method widely used in the art for the manufacture of ammonia, hydrogen is reacted with nitrogen under high pressure, i.e., about 5,000 p.s.i.g. at an elevated temperature such as about 500° C. in the presence of a catalyst, for example a promoted ferric oxide catalyst. One well-known method for the manufacture of feed gas for the synthesis, i.e., ammonia synthesis gas comprising hydrogen and nitrogen in a hydrogen to nitrogen mol ratio of about 3:1, comprises the steps of (1) partial oxidation (reforming) of natural gas with steam, e.g., methane, to produce carbon monoxide plus hydrogen, generally carried out in the presence of a metal oxide catalyst such as nickel oxide, at a temperature generally in the range of 1500–2000° F.; (2) combustion of resulting partial oxidation product with air to form product gas containing hydrogen in the desired mol ratio to nitrogen, generally carried out in the presence of a metal oxide catalyst such as nickel oxide, under conditions resulting in a combustion temperature about 800–900° C.; (3) water gas shift, i.e., passing resulting gas from the combustion, over a shift catalyst, e.g., iron oxide ($Fe_2O_3$) at about 300–500° C. together with the steam to cause a shift of the water gas equilibrium to the carbon dioxide plus hydrogen side; (4) absorption of carbon dioxide from the shift product, such as by absorption in an aqueous alkanol amine, and (5) absorption of residual carbon monoxide from the carbon dioxide effluent, in ammoniacal cuprous solution, the last said absorption being conducted at an elevated pressure, generally within the range of about 100 to 2000 p.s.i.g. Illustrative of such ammoniacal cuprous solutions are ammoniacal cuprous chloride, carbonate, or organic cuprous salts such as cuprous formate. Generally, the said cuprous solution contains from about 5–10 parts of free ammonia per 8–11 parts of cuprous copper (by weight).

In the absorption of carbon monoxide, in the presence of carbon dioxide, in ammoniacal cuprous solution, it is important that the concentration of carbon dioxide in the absorption system be maintained at a low value, because relatively high concentrations of carbon dioxide therein impair the selective action of the cuprous solution for carbon monoxide, and, effluent gases ready for charging to the ammonia synthesis thereby contain carbon monoxide which poisons the ammonia synthesis catalyst. Carbon dioxide present in the absorption system reacts with ammonia therein, thereby reducing the ammonia concentration and preventing the formation of the requisite amount of complex ammonia ion, in absence of which the resulting cuprous solution, low in ammonia, cannot efficiently absorb carbon monoxide from the gas contacted therewith.

It is, therefore, important that the concentration of carbon dioxide in the gas entering the carbon monoxide absorption zone (ammoniacal cuprous solution) be at all times maintained at such a low value that its presence does not adversely affect carbon monoxide absorption.

In accordance with our invention, we have provided process and apparatus wherein, in the absorption of carbon monoxide in ammoniacal cuprous solution from a gas also containing carbon dioxide, ammonia is introduced into the carbon monoxide absorption zone to react with carbon dioxide therein, when the latter is present in proportions that impair selective carbon monoxide absorption efficiency of the ammoniacal cuprous solution.

One concept of this invention provides for measurement of carbon dioxide content of the gas being passed to the carbon monoxide absorption zone, by passing a portion of the gas stream through a conductivity cell containing an aqueous electrolyte capable of reacting with carbon dioxide to form a precipitate, e.g., aqueous barium hydroxide; and, when the conductivity of the electrolyte is decreased to below a predetermined value commensurate with the presence of carbon dioxide in a concentration above that normally permissible in the gas passed to the carbon monoxide absorption zone, introducing ammonia into the absorption zone in response to the resulting conductivity decrease, to react with the excess carbon dioxide present, thereby eliminating the deleterious effect of excess carbon dioxide on the selective carbon monoxide absorption.

A narrower concept of this invention provides for a conductivity cell and for its continuous operation, in which a carbon dioxide-containing gas stream such as that described above, is passed through the conductivity zone in contact with an electrolyte solution of the type above described, the latter also moving as a body through the conductivity zone, the relative flow rates of gas and electrolyte being such that as long as the carbon dioxide concentration in the gas stream does not vary outside a predetermined range, the measured conductivity of the electrolyte is above that which causes actuation of responsive means associated therewith, and, so that when the said carbon dioxide concentration changes to a value outside that predetermined range, conductivity of the electrolyte is changed accordingly to cause actuation of the said flow responsive means.

Our invention in accordance with one form provides for measuring the concentration of carbon dioxide in the gas to be charged to the carbon monoxide absorption system and for introducing ammonia into the absorption system to react with carbon dioxide in response to a measured increase of carbon dioxide concentration that would otherwise impair selective absorption of carbon monoxide in the absorption zone. Our invention further provides that when the measured concentration of carbon dioxide is above, and then decreases to below, that which impairs the said carbon monoxide absorption, flow of ammonia into the absorption zone is terminated in response to the last said change in carbon dioxide concentration.

Although during normal operation the concentration of carbon dioxide is "normal," i.e., is not sufficiently high to impair carbon monoxide absorption, periodic fluctuations in upstream plant operation often cause a "surge" in carbon dioxide concentration, as for example, a partial failure of flow of lean absorbent to the carbon dioxide absorption step, such as may result from pump failure or power failure or inefficient absorption regeneration, or the like. Whatever may be the cause of the "surge" in carbon dioxide concentration, our invention provides for preventing the adverse effect of any such "excess" quantities of carbon dioxide in the carbon monoxide absorption zone.

Figure 2:
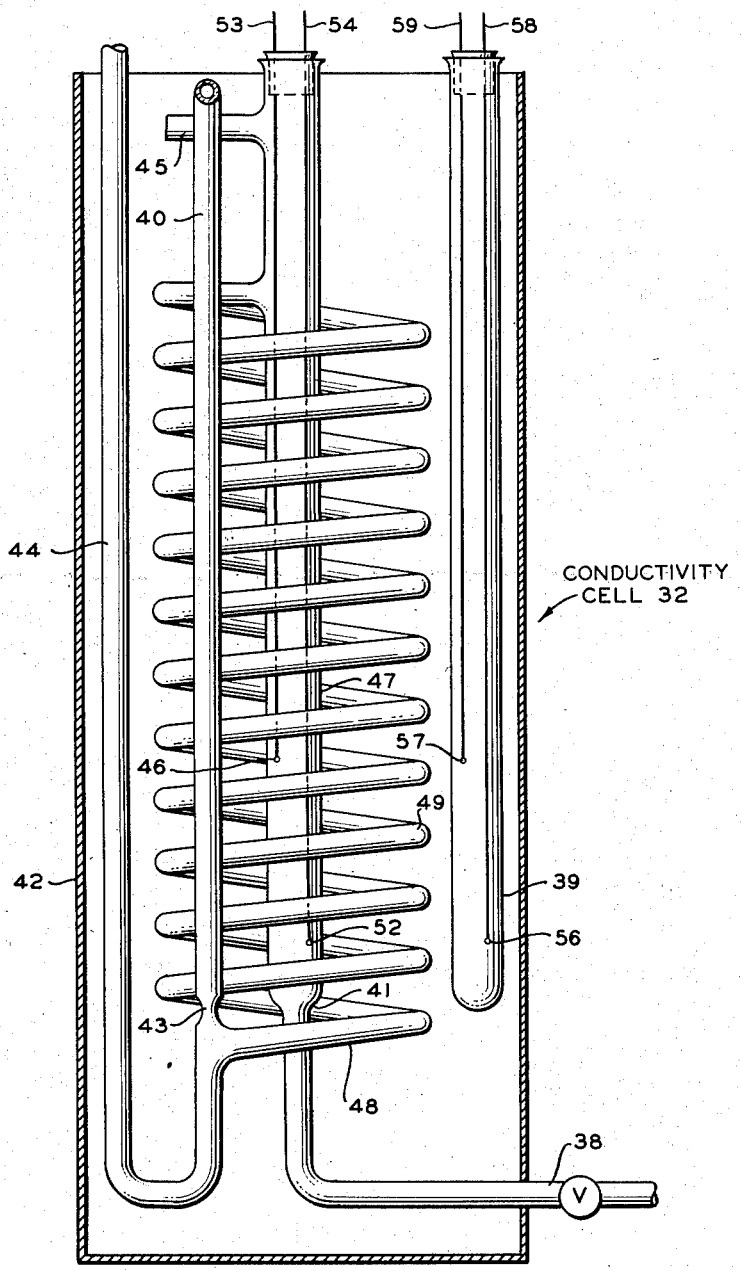
Figure 3:
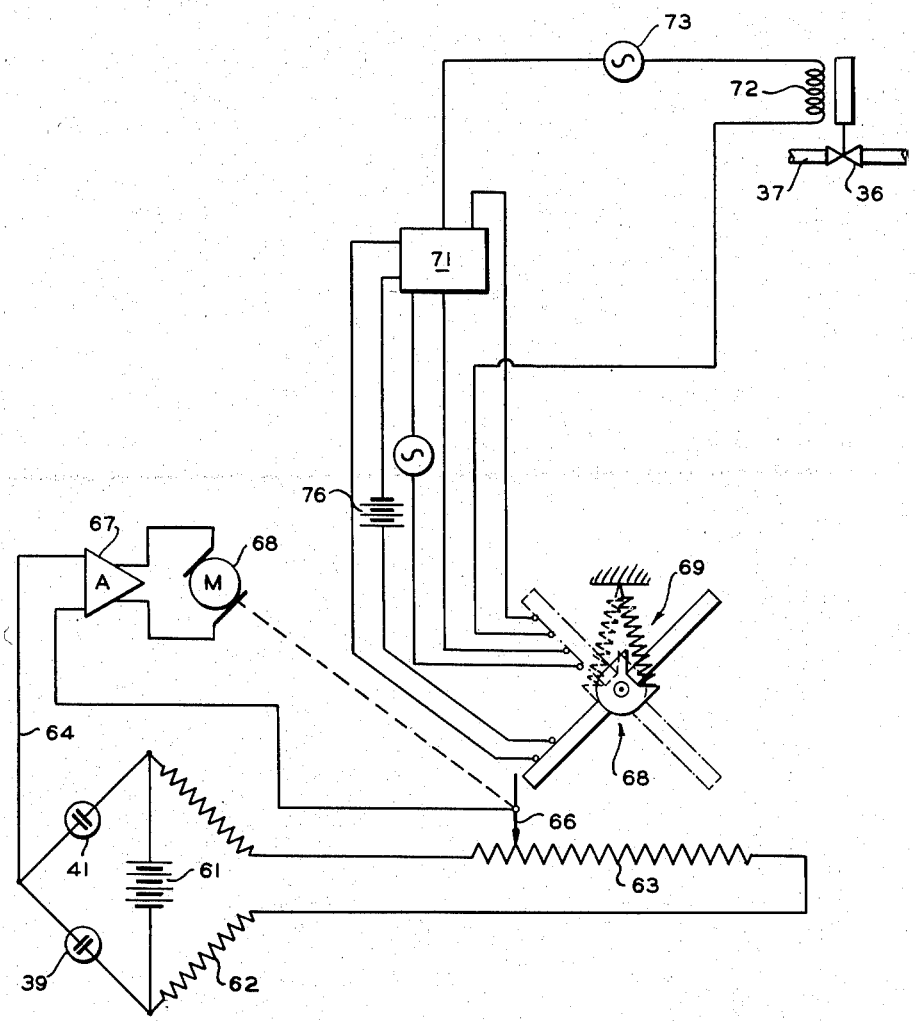

Reference is made to the diagrammatic attached drawings which are illustrative of our invention. Figure 1 illustrates our invention as applied to the manufacture of ammonia synthesis gas in accordance with the method above described encompassing the steps of reforming, combustion, water gas shift, carbon dioxide removal, and carbon monoxide absorption. Figure 2 is illustrative of one form of conductivity cell employed in accordance with our invention. Figure 3 is illustrative of a circuit arrangement that can be utilized in the operation of a conductivity cell in accordance with our invention.

Referring to Figure 1, steam from line 10 and natural gas from line 11 are introduced into reforming zone 12 and contacted therein with a metal oxide as a catalyst, e.g., nickel oxide at a temperature in the range of about 1500–2000° F. to react to form carbon monoxide and hydrogen, the product containing hydrogen to carbon monoxide in a mol ratio of about 3:1. Effluent from zone 12 also containing some carbon dioxide and steam is passed into combustion zone 13 via line 14 wherein it is contacted with air from line 16 in the presence of a metal oxide, e.g., nickel oxide in proportions to provide for total effluent containing hydrogen to nitrogen in a mol ratio suitable for reacting the hydrogen with the nitrogen to form ammonia, i.e., about 3:1. The temperature generally encountered in zone 13 is in the range of about 700–900° C. Effluent from zone 13 is passed through line 17 into "shift" chamber 18 wherein it is contacted with iron oxide as a shift catalyst, at a temperature within the range of about 400–600° C. under which conditions the water-gas equilibrium is shifted to the $H_2+CO_2$ side, steam having been added to facilitate the shift, via line 19.

Total effluent is withdrawn from zone 18 via line 21 and contacted in absorption zone 22 with an aqueous alkaline absorbent, preferably an aqueous alkanol amine introduced into zone 22 via line 23, to remove carbon dioxide. "Enriched" absorbent is withdrawn from zone 22 via line 24 and passed to regeneration, regenerated absorbent generally being at least a portion of that returned to the system through line 23. Effluent gas from zone 22 comprises carbon monoxide, hydrogen, nitrogen, and a residual quantity of carbon dioxide, normally about 0.01 to 0.02 volume percent (100–200 parts per million). The carbon monoxide is present in effluent from zone 22 in a concentration generally in the range of from about 1–4 mol percent and must be removed prior to charging the gas to the ammonia synthesis, carbon monoxide being a well-known ammonia synthesis catalyst poison. Total gaseous effluent is withdrawn from zone 22 via line 26 and contacted with ammoniacal cuprous solution, preferably cuprous formate, at an elevated pressure, in carbon monoxide absorption zone 27 to absorb carbon monoxide from the gas into the ammoniacal cuprous solution. Effluent from zone 27 is withdrawn via line 28 and passed as feed gas (ammonia synthesis gas) to the ammonia synthesis unit, not shown, for conversion to ammonia. "Enriched" cuprous absorbent is withdrawn from zone 27 via line 29, and passed to regeneration. Ammonium carbonate formed as a result of reaction of ammonia with carbon dioxide in zone 27 is withdrawn via line 29 together with "enriched" absorbent from zone 27.

As stated hereinabove, due to various fluctuations in plant operations upstream from the carbon monoxide absorption zone, the content of the carbon dioxide in the gas leaving zone 22 via line 26 may vary, and when it is increased to as high as from 300 to 600 p.p.m., the presence of that carbon dioxide in absorption zone 27 by its reaction with ammonia in the ammoniacal cuprous solution causes a deficiency of complex ammonia ion which in turn results in incomplete carbon monoxide absorption, and the presence of carbon monoxide in the gas charged by line 28 to the ammonia synthesis; which is undesirable, due to the fact that carbon monoxide acts as a catalyst poison in the synthesis zone.

Our invention provides for preventing this adverse effect of excess carbon dioxide in the absorption zone 27, by withdrawing a small side stream of gas from line 26 through line 31 and passing same through a conductivity cell, the latter described in detail hereinafter, containing aqueous electrolyte capable of reacting with carbon dioxide to form a precipitate, under which conditions the carbon dioxide present reacts with the electrolyte to form a precipitate, and to change accordingly the electrical resistance of the solution, i. e., reducing the conductivity as a function of increase in carbon dioxide content of the gas passed through the conductivity cell 32. Residual gas is passed from conductivity cell 32 via line 33. Relay system 34 is operatively connected with conductor cell 32 so as to actuate operation of a valve 36 in line 37 through which ammonia is introduced into absorption zone 27. Thus, relay means 34 in response to conductor cell 32 will cause valve 36 to move into an open position in response to the content of carbon dioxide in gases entering zone 27, when higher than the permissible concentration, and to then move valve 36 into a closed position to terminate ammonia flow into zone 27 when the said carbon dioxide content returns to normal.

The "predetermined maximum" of permissible concentration of carbon dioxide in the gases entering absorption zone 27 is dependent upon the actual concentration of ammonia normally employed in absorption zone 27. Thus, if a large excess of ammonia is normally employed in zone 27, the said "predetermined maximum value" is higher than if a lower ammonia concentration is normally employed in zone 27. However, under normal conditions of operation, the proportions of ammonia employed in absorber 27 are such that when the concentration of carbon dioxide in the gases entering zone 27 exceeds about 300 p.p.m., the "excess" carbon dioxide entering the zone 27 adversely affects absorption therein. In the practice of a preferred embodiment of this invention, the said predetermined maximum value of carbon dioxide concentration is generally about 300 p.p.m. although higher concentrations such as 600 p.p.m. can be employed if for any reason it is desired to maintain such correspondingly high concentrations of ammonia at all times in zone 27.

With reference to Figure 2, conductivity cell 32 comprises standard cell 39 and test cell 41, both maintained within housing 42 in a water bath so as to maintain the test cell and standard cell at the same constant temperature. A gas stream such as a side stream from lines 26 and 31 enters the upper part of the apparatus via line 40 and is passed into the lower portion of line 48 through constriction 43 whereby the gas is contacted with the aqueous electrolyte, e.g., dilute aqueous barium hydroxide preferably 0.01 N. Electrolyte is passed into cell 41 via inlet line 44 and maintained at a level therein above electrode 46, preferably at a level of about level 47, and is discharged via line 38. Gas from line 40 contacts electrolyte present in tube 48 and coil 49, bubbles of gas and droplets of electrolyte passing through the coil 49 and entering the top of cell 41. Gas is discharged via line 45. Electrode 52 is maintained in cell 41 at a predetermined fixed distance from electrode 46, both electrodes being positioned below level 47; the importance of the fixed distance being that of calibrating resistance, i.e., conductivity of the electrolyte, with reference to $CO_2$ content of the gas contacted therewith. Electrodes 46 and 52 are preferably platinum electrodes from which copper leads 53 and 54 lead respectively to a circuit described hereinafter. Standard cell 39 contains the same electrolyte, i.e., the same electrolyte and concentration thereof as that present in cell 41 except that in cell 39, i.e., the standard cell, the electrolyte is isolated from the surrounding atmosphere so that no carbon dioxide is permitted to contact the last said electrolyte. The electrodes in the standard cell 39 are preferably the same and are arranged the same as those in cell 41. These two cells make up two of the legs of a Wheatstone bridge circuit described hereinafter. Electrodes 56 and 57 are connected with copper leads 58 and 59 leading to the said circuit.

With reference to Figure 3, conductivity cell 32 of Figure 1 (illustrated in detail in Figure 2) is connected in a Wheatstone bridge circuit by means of which the change in electrical resistance of the electrolyte in cell 41 is utilized to actuate flow of ammonia into absorber 27 in response to an increase in concentration of carbon dioxide in gases entering absorber 27 to a value above the permissible concentration therein above described. Standard cell 39, via leads 58 and 59 of Figure 2, and test cell 41, via leads 53 and 54 of Figure 2, are mounted in a Wheatstone bridge circuit across which is impressed a D.C. potential voltage by battery 61. In the third arm of the circuit is a fixed resistance 62 and in a fourth arm is a slide wire potentiometer 63. The output from the bridge circuit is through the lead 64 and potentiometer wiper 66 to amplifier 67. Amplifier 67 drives a 2-phase motor 68 which causes wiper 66 to be moved back and forth across potentiometer 63 to cause the Wheatstone bridge to become rebalanced in response to change in conductivity of electrolyte in test cell 41. The circuit of amplifier 67 and motor 68 are of conventional design.

As shown by the drawing (Figure 3) wiper 66 is moved across potentiometer 63 in response to variations in the conductivity of electrolyte in cell 41. When the carbon dioxide concentration, e.g., in the stream in line 26 (Figure 1) exceeds the "predetermined maximum," e.g. 400 p.p.m., wiper 66 will be caused to strike switch 68, pivoted at 69, and being of the spring loaded type to hold itself in either the off position or the on position. When wiper 66 strikes switch 68 in moving toward it, i.e., from the direction shown, a circuit to timer 71 and relay 72 is closed. Timer 71 is set to operate for a predetermined period, for example 15 minutes and thereby permits relay circuit 72 (power source 73) to open valve 36 in line 37 so as to admit ammonia into absorber 27. After the predetermined time interval valve 36 is closed, and if necessary, timer 71 can again be placed in operation by means of reset 76. Should at any time within the predetermined interval (timer 71) the concentration of carbon dioxide in line 26 decreases to below the "predetermined maximum," wiper 66 will be caused to shift away from switch 68 throwing the latter open and thereby stopping timer 71 to open the circuits so as to close valve 36.

It is a feature of this invention that the conductivity cell 32 (Figure 2) can be operated continuously so as to provide for continuous measurement of $CO_2$ concentration in a gas, such as in a gas entering zone 27, and, in response to a predetermined change in the said $CO_2$ concentration, to actuate a given responsive means, such as means for causing flow of ammonia into zone 27 to prevent the otherwise adverse effect of the presence of the "excess" carbon dioxide therein.

In the continuous operation of cell 32, the relative rates of electrolyte flow and gas flow in cell 41 are such that during the time that the $CO_2$ concentration is below the "predetermined maximum," the conductivity of the electrolyte is above that which actuates relay means 34 to open valve 36, but in response to an increase in carbon dioxide concentration to above the said predetermined maximum, the conductivity of electrolyte decreases to a value causing actuation of relay 34 and consequent introduction of ammonia into zone 27. Although the relative rates of flow of electrolyte and gas through test cell 41 are dependent upon the specific electrolyte and concentration thereof selected, and the carbon dioxide concentration in the gas, a rate of electrolyte flow within the range of 500 to 4000 ml. per liter of gas per hour is within the range generally employed. When employing the preferred electrolyte, i.e., aqueous 0.01 N-barium hydroxide, the preferred rates of electrolyte and gas flow are generally within the range of 1000 to 3000 ml. 0.01 N-barium hydroxide per liter of gas per hour.

Although we have illustrated, with reference to Figure 1, that relay means 34 causes operation of the valve 36 in line 37, it is to be understood that instead of a valve 36, a pump 36 can be inserted in line 37 and its operation actuated by relay 34, e.g. actuation of an electric motor driving the pump. Also, if desired to introduce ammonia manually into zone 27, relay 34 can be utilized to actuate an alarm signal to indicate to the plant operator, the need for addition of ammonia to zone 27. It is also to be understood that valve 36 can be a solenoid-operated valve or can be an air-operated diaphragm type valve. In the latter case relay 34 preferably actuates control means for admitting air pressure to the said valve and for moving same to the requisite operating position.

Variation and modification are possible within the scope of the foregoing disclosure, drawings, and appended claims to the invention, the essence of which is process and apparatus wherein, in the absorption of carbon monoxide in ammoniacal cuprous solution from a gas also containing carbon dioxide, ammonia is introduced into the absorption zone to react with carbon dioxide therein when present in proportions that impair selective carbon monoxide absorption efficiency; wherein, in accordance with another concept providing for passing a side stream of the said carbon dioxide-containing gas in contact with an electrolyte capable of forming a precipitate when reacted with carbon dioxide, such as dilute aqueous barium hydroxide, measuring change in conductivity of the said electrolyte and regulating flow of ammonia to the zone of the said absorption, in response to a predetermined change in the said conductivity, the latter a function of concentration of carbon dioxide in the gas, so as to prevent the presence of "impairing" proportions of carbon dioxide in the said absorption zone; wherein, in accordance with still another concept providing a conductivity cell and its operation comprising continuously passing an electrolyte such as dilute aqueous barium hydroxide in contact with a carbon dioxide-containing gas in a conductivity cell to continuously measure concentration of carbon dioxide in the said gas as a function of electrical conductivity of the electrolyte, and actuating responsive means in response to a predetermined change in the said conductivity.

We claim:
1. In a process wherein carbon monoxide is removed from a gas also containing carbon dioxide, by selective absorption in ammoniacal cuprous solution and wherein said gas when containing carbon dioxide in a concentration greater than a predetermined maximum value impairs said selective absorption, the step of continuously measuring said carbon dioxide concentration prior to passing said gas to said absorption, and in response to an increase in said carbon dioxide concentration to above said predetermined maximum value introducing ammonia into the zone of said absorption in controlled proportions to react with carbon dioxide present in excess of said predetermined maximum concentration.

2. In the production of ammonia synthesis gas in which a hydrocarbon gas is reformed to carbon monoxide plus hydrogen, a product of reforming is burned with air to form resulting gas mixture containing hydrogen and nitrogen for conversion to ammonia, wherein carbon monoxide is then converted to carbon dioxide by the water-gas shift reaction and wherein carbon dioxide is removed from the resulting gas mixture and carbon monoxide is thereafter removed by absorption in ammoniacal cuprous solution, and wherein the concentration of residual carbon dioxide in the gas being contacted with said cuprous solution when above a predetermined maximum value impairs efficiency of selective absorption of carbon monoxide by said cuprous solution, the improvement comprising continuously passing a stream of effluent gas from said carbon dioxide removal through a body of aqueous electrolyte capable of reacting with carbon dioxide to form a precipitate, whereby electrical conductivity of said electrolyte is decreased commensurate with increased carbon dioxide concentration in said gas, continuously measuring the electrical conductivity of said electrolyte resulting from contact of same with said gas, and admitting ammonia into the zone of said absorption in response to a decrease in said conductivity resulting from a concentration of said residual carbon dioxide above said predetermined maximum, in an amount to react with carbon dioxide present in excess of said predetermined maximum concentration.

3. The improvement of claim 2 wherein said electrolyte is 0.1 N-barium hydroxide.

4. The improvement of claim 2 wherein said residual concentration of carbon dioxide is within the range of 300–600 parts per million.

5. The improvement of claim 2 wherein said electrical conductivity is continuously measured with reference to conductivity of a separate body of electrolyte solution which is free from contact with carbon dioxide; forming a Wheatstone bridge circuit by disposing as a first arm the first said body of electrolyte, as a second arm the said separate body of electrolyte, as a third arm a fixed resistance, and as a fourth arm an adjustable resistance; impressing a D.C. current across said circuit and balancing said circuit; rebalancing said circuit in response to a change in conductivity of said electrolyte; and introducing ammonia into said absorption zone in response to the said rebalancing when effected subsequent to said decrease in conductivity.

6. The improvement of claim 5 wherein flow of ammonia to said absorption zone is terminated in response to rebalancing said circuit subsequent to an increase in conductivity resulting from a decrease in concentration of said residual carbon dioxide to below said predetermined maximum.

7. In the removal of carbon monoxide from a gas containing carbon dioxide, by absorption in ammoniacal cuprous solution, wherein carbon dioxide when present in said gas in a concentration above a predetermined maximum value impairs efficiency of said absorption of carbon monoxide, the improvement comprising continuously passing a body of aqueous electrolyte capable of forming a precipitate with carbon dioxide, through a conductivity zone; continuously passing a stream of said gas through said conductivity zone in contact with a moving body of said electrolyte; correlating the relative rates of flow of electrolyte and gas through said zone so that the conductivity of said electrolyte exceeds a predetermined minimum value only while said carbon dioxide content is below said predetermined maximum, and so that the said conductivity decreases to below said predetermined minimum when said carbon dioxide concentration is greater than its said predetermined maximum; and passing ammonia into the zone of said carbon dioxide absorption in response to a decrease in said conductivity to a value below said predetermined minimum, in an amount to react with carbon dioxide present in excess of said predetermined maximum concentration.

8. The improvement of claim 7 wherein from 500 to 4000 volumes of said electrolyte per liter of said gas, per hour, is passed through said conductivity zone.

9. The improvement of claim 8 wherein the said electrolyte is dilute aqueous barium hydroxide.

10. The improvement of claim 9 wherein said barium hydroxide is 0.01 N-barium hydroxide.

11. In a process wherein carbon monoxide is removed from a gas also containing carbon dioxide, by selective absorption in a vessel containing ammoniacal cuprous solution and wherein said gas when containing carbon dioxide in a concentration greater than a predetermined maximum value impairs said selective absorption, the step of continuously measuring said carbon dioxide concentration prior to passing said gas to said absorption vessel by passing a portion of the gas stream through a conductivity cell containing an aqueous electrolyte capable of reacting with carbon dioxide to form a precipitate, and in response to an increase in said carbon dioxide concentration to above said predetermined maximum value as measured by said cell, said conductivity cell causes actuation of valve responsive means associated therewith for introduction of ammonia into said absorption vessel in a controlled amount to react with carbon dioxide present in excess of said predetermined maximum concentration.

12. The method of claim 11 wherein said electrolyte is 0.01 N-barium hydroxide.

13. The method of claim 11 wherein the said predetermined maximum value of carbon dioxide concentration is within the range of 300–600 parts per million.

References Cited in the file of this patent

UNITED STATES PATENTS

| | | |
|---|---|---|
| 1,341,790 | Edelman | June 1, 1920 |
| 1,951,035 | Parker | Mar. 13, 1934 |
| 2,043,263 | Porter | June 9, 1936 |
| 2,230,593 | Hassler | Feb. 4, 1941 |
| 2,580,527 | Deringer | Jan. 1, 1952 |
| 2,610,106 | Gray | Sept. 9, 1952 |
| 2,631,925 | Cohn | Mar. 17, 1953 |
| 2,652,315 | McEvoy | Sept. 15, 1953 |
| 2,695,836 | Gilmore | Nov. 30, 1954 |

OTHER REFERENCES

Hainsworth: "Absorption of Carbon Monoxide," Journal of American Chem. Societies, vol. 43, No. 1, January 1921, pp. 1–11.